United States Patent [19]

Zelazny et al.

[11] Patent Number: 5,191,007
[45] Date of Patent: Mar. 2, 1993

[54] PVC MEMBRANE FOR SWIMMING POOL LINER

[75] Inventors: Julian Zelazny, Allenstown; David R. Morse, Sandown, both of N.H.

[73] Assignee: Borden, Inc., Columbus, Ohio

[21] Appl. No.: 755,086

[22] Filed: Sep. 5, 1991

[51] Int. Cl.$^5$ .......................... C08K 5/524; C08K 5/09
[52] U.S. Cl. ..................................... 524/336; 428/518; 524/337; 524/338; 524/147; 524/399; 525/239
[58] Field of Search ................ 525/239; 524/399, 336, 524/337, 338, 147; 428/518

[56] References Cited

U.S. PATENT DOCUMENTS

| | | | |
|---|---|---|---|
| 3,660,320 | 5/1972 | Johnson et al. | 525/239 |
| 3,846,395 | 11/1974 | Harper et al. | 260/94.9 |
| 3,994,844 | 11/1976 | Rhodes et al. | 260/23 |
| 4,169,089 | 9/1979 | Minagawa et al. | 260/45.95 |
| 4,267,084 | 5/1981 | Mitani et al. | 260/23 |
| 4,659,764 | 4/1987 | Isao et al. | 524/399 |
| 4,668,740 | 5/1987 | Okano | 525/227 |
| 4,751,261 | 6/1988 | Miyata et al. | 524/181 |
| 4,861,816 | 8/1989 | Kobayashi et al. | 524/204 |
| 4,914,154 | 4/1990 | Haller et al. | 525/239 |
| 5,004,776 | 4/1991 | Tadenuma et al. | 524/377 |
| 5,143,975 | 5/1991 | Greenlee et al. | 565/239 |

FOREIGN PATENT DOCUMENTS 2592386 7/1987 France .
0148744 6/1981 German Democratic Rep. .

OTHER PUBLICATIONS

Tech Serv. Bull. of Jun. 1988 Occidental Chemical Corp. "High Molecular Weight Resin Evaluation".
Witco Material Safety Data Sheet for "Mark 4731 Liquid Barium-Zinc Stabilizer".
Cust. Serv. Report 87-0047-PAD of Eastman Chemical Products, Inc. dated Sep. 8, 1987.

*Primary Examiner*—Veronica P. Hoke
*Attorney, Agent, or Firm*—George P. Maskas; Kenneth P. Van Wyck; Dennis H. Rainear

[57] ABSTRACT

Polyvinyl chloride compositions as well as flexible sheets and swimming pool liners of such compositions which contain significant quantities of an ultra high molecular weight polyvinyl chloride resin together with a heat stabilizer, plasticizer and optional additives are disclosed. In preferred compositions: the PVC resin is a mixture of high molecular weight and ultra high molecular weight PVC: the heat stabilizer is a mixed zinc-barium-alkyl phosphite stabilizer; and the composition contains 2-hydroxy-4-(2-hydroxyethoxy) benzophenone as an ultraviolet light absorber.

29 Claims, No Drawings

PVC MEMBRANE FOR SWIMMING POOL LINER

BACKGROUND OF THE INVENTION (1) Field of the Invention

Swimming pool liners made of polyvinyl chloride (PVC) are subjected to many aggressive factors before and during their period of use. Prior to installation they are folded and stored in cartons. Severe stresses are placed on the PVC liner along the folds of the material in the cartons so that, upon opening, the liners are often found to be cracked.

Once the liners are installed, a multitude of exposures attack the PVC and violate the structural integrity of the polymer. Swimming pool chemicals as well as acidic and alkaline pool liner cleaners contribute to the degrading effects of ultraviolet radiation on the pool liner, especially along the waterline. When the PVC film is subjected to these aggressive agents, degradation of the polymer occurs. The degradation usually manifests itself as a brown stain around the liner above the water line.

(2) Description of the Related Art

Abstract of East German publication 0148-744 of June 1981 to Veb Porzellanw Cold discloses a two component PVC mix with one PVC component having K value of 59-60 while the other has a K value of 66-69. The PVC mix is used for making a mold.

Okano U.S. Pat. No. 4,668,740 of May 26, 1987 mixes PVC with molecular weight in the range of 18,000-43,000 with PVC of higher molecular weight.

Mizutani et al. U.S. Pat. No. 4,267,084 of May 12, 1981 describes mixing a first PVC having a sulfide linkage with a second PVC having a higher molecular weight than the first PVC.

Rhodes et al. U.S. Pat. No. 3,994,844 of Nov. 30, 1976 describes the use of certain zinc organic phosphites as heat stabilizers for vinyl halide resins such as PVC.

Kobayashi et al. U.S. Pat. No. 4,861,816 of Aug. 29, 1989 describes a stabilizer for PVC resins wherein the stabilizer comprises a mixture of barium salts and zinc salts.

Abstract of French 2592-386-A to Soc. Nat. Elf Aquitaine which was published on July 1987 relates to stabilization of halogenovinyl resins against heat by incorporating organic metal compounds and an alkaline earth metal phosphite as stabilizers.

Minagawa et al. U.S. Pat. No. 4,169,089 of Sep. 25, 1979 describes formulations based on various benzophenone compounds which are designed to protect certain polyesters and olefins that are processed at temperatures in excess of 200° C.

Harper et al. U.S. Pat. No. 3,846,395 of Nov. 5, 1974 describes polymeric formulations based on various benzophenone compounds, including p-laurylbenzophenone which are allegedly particularly useful for polyolefin compositions.

M. Isao et al. U.S. Pat. No. 4,659,764 of Apr. 21, 1987 relates to PVC heat stabilizers of barium-zinc carboxylic acid soap mixtures and an organic magnesium compound.

S. Miyata et al. U.S. Pat. No. 4,751,261 of Jun. 14, 1988 relates to PVC stabilizers containing an organic acid salt of zinc.

M. Tadenuma et al. U.S. Pat. No. 5,004,776 of Apr. 2, 1991 relates to PVC heat stabilizers which include alkaline earth metal carboxylates.

Technical Service bulletin of June 1988 of Occidental Chemical Corporation entitled "HIGH MOLECULAR WEIGHT RESI EVALUATION" compares properties of ultra high molecular weight PVC (Oxy 410) in relation to other PVC resins, mentions sheets and gaskets among the uses for such resins and lists advantageous properties.

Witco Material Safety Data Sheet directed to "Mark 4731 LIQUID BARIUM-ZINC STABILIZER", which is a preferred barium zinc-alkyl phosphite used in this invention and which, to applicants, knowledge, has not been used in swimming pool liner formulations.

Customer Service Report No. 87-0047-PAD of Eastman Chemical Products, Inc. which is dated Sep. 8, 1987 and which describes 4-(2-hydroxyethoxy)-2-hydroxybenzophenone as an improved U.V. inhibitor for PVC plastics and which, to applicants' knowledge, has not been used in swimming pool liner formulations.

Pool liner formulations are generally made of a conventional high molecular weight PVC resin such as one having a molecular weight of about 115,000 to 150,000, a conventional benzophenone or benzotriazole ultra violet (UV) absorber and a mixed barium-cadmium-zinc heat stabilizer. Formulation B, shown hereafter, is a prior art formulation.

SUMMARY OF THE INVENTION

The compositions of this invention decrease the incidence of common field problems in the polyvinyl chloride (PVC) pool liner industry such as: stress cracking on the folds of the PVC liner upon removal from its carton; stiffness and cracking at low temperatures; and the development of dark discoloration around the top of the liner immediately above the water line due to the combined attack from pool maintenance chemicals and ultraviolet radiation. The compositions of this invention: inhibit the development of stress cracks; improve low temperature flexibility; improve ultra violet and thermal stability; and resist chemical attack.

This invention is directed to PVC compositions containing a significant quantity of ultra high molecular weight PVC together with a heat stabilizer and a plasticizer.

In other aspects of the invention, the PVC resin of the above compositions contains a mixture of PVC resins having differing molecular weights. Illustratively, the resin comprises a mixture containing a significant quantity of an ultra high molecular weight PVC resin such as one having a molecular weight of from about 185,000 to 225,000 and a significant quantity of a high molecular weight PVC resin such as one having a molecular weight of about 115,000 to 150,000.

In still another aspect of the invention the PVC compositions contain a mixed barium-zinc-alkyl phosphite heat stabilizer which has been found to have advantageous properties.

In still a further aspect of the invention, the compositions include certain benzophenone ultra violet absorbers.

This invention is also directed to flexible PVC sheets prepared from the above PVC resin compositions which are useful in making pool liners, processes for preparing the above mentioned PVC resin sheets and pool liners as well as the swimming pool liners prepared therefrom.

Some or all of the PVC resin used in this invention is ultra high molecular weight PVC i.e. PVC having a molecular weight of at least 185,000. Such ultra high molecular weight PVC imparts a unique toughness, chemical resistance and low temperature performance not found in current pool liners. Dielectric seam strength is also greatly improved as is resistance to cracking on the folds by use of ultra high molecular weight PVC.

The preferred heat stabilizer is a mixed-barium-zinc-alkyl phosphite composition. The barium and zinc stabilizers provide good chemical resistance, e.g., from swimming pool chemicals as well as acidic and alkaline pool liner cleaners. The alkyl phosphite improves stain resistance and provides improved results in comparison with aromatic phosphites. The preferred UV absorber is a 2-hydroxy-4-(2-hydroxyloweralkoxy)benzophenone having from 1 to 4 carbon atoms in the alkoxy group.

DETAILED DESCRIPTION OF THE INVENTION

The polyvinyl chloride (PVC) compositions of this invention will contain a polyvinyl chloride resin wherein at least 35% of the resin is ultra high molecular weight polyvinyl chloride resin, i.e. PVC resin having a molecular weight of at least 185,000, a plasticizer, and a heat stabilizer. Additionally, such compositions may further include additives known in the art, such as antioxidants, ultra violet (U.V.) absorbers, costabilizers, lubricants, pigments and fillers.

The polyvinyl chloride used in the present invention will have a vinyl chloride unit content of at least 80% by weight, preferably at least 95% by weight and includes homopolymers of vinyl chloride, copolymers of vinyl chloride with ethylenically unsaturated monomers copolymerizable therewith and mixtures thereof. Polyvinyl chloride polymers prepared by emulsion polymerization, suspension polymerization, or bulk polymerization may be used in the present invention. The ethylenically unsaturated comonomers copolymerizable with vinyl chloride may be a variety of known compounds. Typical examples include olefinic compounds such as ethylene and propylene, vinyl esters such as vinyl acetate and vinyl propionate, unsaturated carboxylic acids and the esters or amide thereof such as acrylic acid, methacrylic acid, methyl acrylate, etc.

Based on a total of 100 parts of PVC the compositions of this invention will contain at least 35% and preferably from about 40% to 60% of the ultra high molecular weight PVC based on the total weight of PVC in the composition. As the percentage of ultra high molecular weight resin increases, the composition becomes more difficult to process so that the compositions will generally not exceed 75% to 80% of the ultra high molecular weight resin based on the total weight of PVC resin in the composition. The ultra high molecular weight resin has a molecular weight of at least 185,000, preferably from about 185,000 to 225,000 and particularly from about 190,000 to 210,000. The ultra high molecular weight resin is preferably a homopolymer of vinyl chloride or at least 95% of the ultra high molecular weight resin is made up of vinyl chloride units. The total quantity of PVC in the composition, also referred to as formulated composition, will generally vary from about 75% to 50% of the composition, preferably from about 55% to 65% based on the weight of the composition.

In addition to the ultra high molecular weight PVC resin, the PVC resin can comprise conventional high molecular weight, medium molecular weight and low molecular weight PVC resins as well as mixtures thereof. Such high, medium and low molecular weight PVC resins can make up the difference in quantity between the quantity of ultra high molecular weight PVC and the total quantity of PVC in the composition. Preferably such other PVC resin will make up from about 20% to 65% of the total PVC resin mixture with the remaining being the ultra high molecular weight PVC. Preferred formulations are a mixture which contain both ultra high molecular weight PVC resin and high molecular weight PVC resin. High molecular weight PVC has a molecular weight of from about 115,000 to 150,000 and preferably from about 120,000 to 130,000.

Conventional heat stabilizers can be employed in the compositions of this invention. Thus, the stabilizer can be a salt of a carboxylic acid with a metal such as barium, tin, calcium, magnesium, zinc or the like either individually or in combination. Also, the stabilizer can be an organic ester of phosphorous acid or the like and combinations of such ester With a carboxylic acid salt. The organic ester of phosphorous acid, which may be used as the heat stabilizer is typically an aryl or alkyl phosphite such as a mono-, di-, or trialkyl phosphite. The number of carbon atoms in each alkyl group can vary over a wide range such as from 4 to 24 carbon atoms. The organic ester of phosphorous acid can also be a polyol ester type phosphite. Illustrative of alkyl phosphites there can be mentioned: triisooctyl phosphite, triisodecyl phosphite, distearylpentaerythritol diphosphite, tributyl phosphite, zinc and/or barium mono- or dialkyl phosphites such as dihexyl zinc di(-dihexyl phosphite), zinc di(dilauryl phosphite), barium di (dioctyl phosphite), zinc di(dinonyl phosphite), barium di(dipalmityl phosphite) and the like. As further examples of heat stabilizers there can be mentioned: metal soap heat stabilizers such as Ca, Mg and Ba salts of fatty acids, e,g., 2-hexylhexanoic acid, lauric acid, myristic acid, palmitic acid, stearic acid, hydroxystearic acid, linoleic acid, behenic acid, isostearic acid, oleic acid and ricinoleic acid, composite metal salt heat stabilizers such as Ca/Zn and Ba/Zn salts of fatty acids as described above; phosphite type heat stabilizers such as various trialkyl phosphites, e.g., trioctyl phosphite, oligophosphites , e,g,, pentaerythritol phosphite, and the like. The heat stabilizer can be a mixture of a barium and a zinc salt of a carboxylic acid, or of a phosphite.

Applicants' have found that superior properties are obtained when the heat stabilizer is a mixed barium-zinc-alkyl phosphite. Such stabilzer can be a mixture of individual barium, zinc and alkyl phosphite heat stabilizers or the alkyl phosphite can be provided as part of a barium and/or zinc compound ,e.g. barium di(dioctyl phosphite). Thus, this stabilizer mixture can have at least three components such as when different barium, zinc and alkyl phosphite compounds are used. Also, the stabilizer mixture can have at least two components when either the barium or zinc is chemically combined with an alkyl phosphite and it is possible that the mixture be but one chemical compound which contains barium, zinc and an alkyl phosphite. The heat stabilizer is preferably a physical blend of a barium soap, a zinc soap, an alkyl phosphite and solvents for the blend. Typical anions of the zinc and barium metal soaps are phenate, benzoate and stearate.

The quantity of each of the barium, zinc and phosphite in the preferred stabilizer mixture containing such element or group can vary over a broad range such as from about 2% to 20% by weight of the stabilizer mixture. When used, it is preferred that each of the barium, zinc and phosphite stabilizers be present in a quantity of at least 3% by weight of the stabilizer mixture. The remaining portion of the stabilizer is principally that of solvent.

The total quantity of heat stabilizer can vary from 1 to 6 parts by weight based on each 100 parts of PVC resin. The heat stabilizers useful in this invention include those described in the following references which are incorporated herein by reference: Rhodes et al. U.S. Pat. No. 3,994,844 of Nov. 30, 1976; Kobayashi U.S. Pat. No. 4,861,816 of Aug. 29, 1989; French abstract 2592-386-A to Soc. Nat. Elf which was published on July 1987; M. Iaso et al. U.S. Pat. No. 4,659,764 of Apr. 21, 1987; S. Miyata et as. U.S. Pat. No. 4,751,261 of Jun. 14, 1988; and M. Tadenuma et al. U.S. Pat. No. 5,005,776 of Apr. 2, 1991.

The PVC compositions can contain costabilizers such as epoxy compounds, e.g., epoxidized soybean oil, expoxidized linseed oil, epoxidized castor oil, butyl ester of epoxidized linseed oil fatty acid, butyl or 2-ethylepoxystearate, and the like. The quantity of costabilizer, when used, can vary from about 1 to 15 parts based on each 100 parts of PVC resin.

Conventional ultra violet (U.V.) light absorbers can be used such as that of a benzotriazole compound, benzophenone compound, or a hindered amine compound and specifically includes 2-(3,5-di-t-butyl-2-hydroxyphenyl)benzotriazole; 2-(3,5-di-t-butyl-2-hydroxyphenyl)-5-benzotriazole; polycondensate of dimethyl succinate with 1-(2-hydroxyethyl)-4-hydroxy-2,2,6,6-tetramethylpiperidine, various 2-hydroxy-4-alkoxybenzophenones, e.g., 5,5'-methylenebis(2hydroxy-4-lauroxybenzophenone), 5,5'-methylenebis(2-hydroxy-4-octoxybenzophenone), and the like.

The U.V. absorbers useful in this invention include those described in the Isao et al. U.S. Pat. No. 4,659,764 of Apr. 12, 1987, the Miyata et al. U.S. Pat. No. 4,751,261 of Jun. 14, 1988, the Minagawa et al. U.S. Pat. No. 4,169,089 of Sep. 25, 1979, and the Kobayashi et al. U.S. Pat. No. 4,861,816 of Aug. 29, 1989, all of which are incorporated herein by reference. The quantity of U.V. absorber, when used, will generally vary from 0.1 to 1 part for each 100 parts, by weight of the PVC resin. The preferred U.V. absorbers are 2-hydroxy-4-(2-hydroxyalkoxy)benzophenone having from 1 to 4 carbon atoms in the alkoxy group such as 2-hydroxy-4-(2-hydroxyethoxy)benzophenone.

Conventional plasticizers for PVC can be used in this invention. Illustrative of such plasticizers there can be mentioned: phthalic acid esters such as dibutyl phthalate, dioctyl phthalate, diisodecyl phthalate, diisoundecyl phthalate, etc.; trimellitic acid esters such as trioctyl trimellitate, tri-2-ethylhexyl trimellitate, tridecyl trimellitate, etc.; adipic acid esters such as dioctyl adipate, diisodecyl adipate, etc.; phosphoric acid esters such as tricresyl phosphate, trioctyl phosphate, etc; epoxy plasticizers and liquid polyesters. The preferred plasticizers are those of the phthalic acid esters and adipic acid esters, particularly those wherein each of the hydrocarbyl substituents on the phthalate or adipate are straight chain alkyl groups having at least 7 carbon atoms such as that of 7 to 11 carbon atoms. The straight chain phthalates and adipates have greater permanence in the composition and keep the film flexible for a longer period of time. The straight chain alkyl groups of 7 or more carbon atoms can be the same or different on each of the phthalate or adipate groups. Also, the alkyl groups can have an odd number or an even number of carbon atoms. Illustrative of such straight chain groups there can be mentioned those of n-heptyl, n-octyl, n-nonyl, n-decyl, and n-undecyl, e.g., such as with n-nonyl, n-nonyl phthalate.

The quantity of plasticizer can vary over a broad range such as that of from about 30 to 100 parts of plasticizer for each 100 parts of PVC resin.

Other additives such as biocides and pigments can also be used. The quantity of biocide, when used, will vary from about 1 to 10 parts for each 100 parts of PVC resin. Typically the biocide is a solution containing about 2% to 8% of active ingredient. Illustrative of such biocides are those which contain organic arsenic compounds such as 10,10'-oxybisphenoxarsine. A preferred concentration of the active ingredient will generally be from about 200 to 1,000 parts per million parts by weight of polyvinyl chloride composition. The quantity of pigment, when used, will be sufficient to provide the proper amount of coloration to a sheet of PVC. The compositions can also include processing aids such as acrylic processing aids. The quantity of processing aid, when used, will vary from about 0.5 to 10 parts for each 100 parts of PVC resin.

A preferred formulation for the PVC resin composition used in this invention is set forth below. This formulation is also referred to herein as Formula A or Formulation A.

| Formulation A | Parts by Weight |
| --- | --- |
| Ultra high molecular weight PVC resin (Oxy 410)[1] | 50 |
| High molecular weight PVC resin (VC 106)[2] | 50 |
| Epoxidized soybean oil (Drapex 6.8)[3] | 5 |
| Barium-Zinc stabilizer (Mark 4731)[3] | 2 |
| Plasticizer (Jayflex 91, Jayflex 7911)[4] | 58 |
| Biocide (Vinyzene BP5-5)[5] | 1.2 |
| Ultraviolet light absorber (HHBP)[6] | 0.3 |
| Acrylic process aid (Acryloid K120-N)[7] | 1.5 |
| Stearic acid lubricant | 0.4 |
| Pigmentation | As Required |

In the above table:
[1] is a Trademark of Occidental Petroleum;
[2] is a trademark of Borden Chemicals & Plastics;
[3] is a trademark of Argus Chemical, Division of Witco;
[4] are trademarks of Exxon Chemicals for dialkyl phthalate having straight chain (linear) alkyl groups of at least 7 carbon atoms in each alkyl group wherein Jayflex 91 is preferred;
[5] is a trademark of Morton International;
[6] is a trademark of Eastman Chemical Products; and
[7] is a trademark of Rohm and Haas.

The ultra high molecular weight PVC resin set forth in the above table (Oxy 410) has a molecular weight of about 200,000, a relative viscosity of 4.0 and a Finkenstscher K value of about 93. The high molecular weight PVC resin (VC106) of the above table has a molecular weight of 120,000 to 130,000, a relative viscosity of 2.5 and a Finkentscher K value of about 72. The barium-zinc stabilizer (Mark 4731) includes alkyl phosphate.

Broadly, the flexible PVC resin sheets are prepared by mixing and fluxing the ingredients and then forming the sheet such as by calendaring.

The preferred method for preparing the flexible PVC sheet of this invention is described as follows:

A. A steam-heated ribbon blender is charged with 3,600 pounds of compound by sequential addition of ingredients in Formulation A in the appropriate ratios. The blender is operated at approximately 175° F. for 20 minutes or until the compound appears dry.

B. The dry compound is then dropped in batches of approximately 160 pounds into a banbury mixer. The compound is fluxed and masticated within the banbury for 5 minutes. The pigmentation is fluxed with the compound in this step. At a temperature of about 350° F. the globular plastic batch is dropped onto a two-roll mill. The material is milled for a time on the two-roll drop mill and is then fed onto a two-roll feedmill. The dwell time of the material in the two-roll mill is dependant upon the speed of the calender and the banbury drop frequency. The mills are heated at 350° F.

C. From the feed mill the material is run into an extruder which extrudes a "rope" onto a conveyer which deposits the material between the No. 1 and No. 2 rolls in the top of the calender. These calenders are the inverted "L" type. The No.1 and No. 2 rolls are parallel to each other arranged horizontally. Roll No. 3 is directly beneath and parallel to roll No. 2 and roll No.4 is beneath roll No. 3. The rolls are oil heated to 370° F. for rolls No.1 and No.2, 390° F. for roll No. 3 and 345° F. for roll No.4. The calender is adjusted so that the sheet emerges with the correct thickness. Thicknesses of 0.02 inches to 0.03 inches are most common for this sheet. The sheet is sent through an embossing station, a series of cooling cans, an accumulator and finally to a winder. The final sheet is wound onto cores and sent to the pool liner manufacturer; or wound onto A-Frames, printed, coated and then wound on cores for shipping. The coating is generally a clear coating which overlies and protects the printing.

After removing the sheet from the roll, the pool liner manufacturer forms the PVC liner by cutting it to desired size and shape which is dependent on the size and shape of the swimming pool. The cut sheets are then welded together by electric sealing. The dimensions as to the sides and bottom of the liner will generally conform to the rigid pool structure outwardly of the liner.

The following examples are illustrative of the invention. The recitation of parts for the various ingredients are by weight, unless otherwise specified.

EXAMPLE 1

A comparison was made of physical properties of a swimming pool liner having the composition of Formulation A as described hereinbefore with a conventional swimming pool liner of the following composition, also referred to as Formulation B.

| Formulation B | Parts by Weight |
| --- | --- |
| High Molecular Weight PVC Resin (VC 106)[2] | 100 |
| Epoxidized Soybean Oil (Drapex 6.8)[3] | 5 |
| Plasticizer (Jayflex 7911)[4] | 55 |
| Ba-Cd-Zn Stabilizer (Mark 7187)[3] | 2 |
| Biocide (Vinyzene BP5-5)[5] | 1 |
| Ultraviolet Light Absorber (Mark 1413)[3] | 0.25 |
| Acrylic Process Aid (Acryloid K-120-N)[7] | 1 |
| Stearic Acid | 0.4 |
| Pigmentation | As Required |

In the above table:
[2] is a trademark of Borden Chemicals & Plastics;
[3] are trademarks of Argus Chemical, Division of Witco;
[4] is a trademark of Exxon Chemicals for a dialkyl phthalate having straight chain (linear) alkyl groups of at least 7 carbon atoms in each alkyl group;
[5] is a trademark of Morton International; and
[7] is a trademark of Rohm and Haas.

The results of this comparison are shown in Table 1. It can be seen from Table 1 that the two sheets are of identical thickness and specific gravity. Since the values for 100% Modulus are effectively the same, the samples are the same "hand" or firmness. The tensile strength values show a 20% improvement in Formula A (the invention formula over the prior art Formula B). Similarly, there is a 25% improvement in elongation. These values are significant in that they predict an overall improvement in durability of the liner. When this information is combined with the fact that sheet made from Formula A has 5% less compression set and a 20° F. better cold crack value than sheet made from Formula B, it is assured that this more durable Formula A will outperform Formula B in cases where physical properties are critical, specifically, the problem of cracks along the folds of the pool liner will be abated with sheet made from Formula A.

TABLE 1

| COMPARISON OF PHYSICAL PROPERTIES OF CONVENTIONAL POOL LINER OF FORMULATION B WITH POOL LINER OF FORMULATION A | | |
| --- | --- | --- |
| PROPERTY | FORMULATION A | FORMULATION B |
| Thickness (inches) | 0.02 | 0.02 |
| Specific Gravity | 1.23 | 1.23 |
| Tensile (psi) MD/TD | 3152/2762 | 2500/2200 |
| Elongation (%) MD/TD | 463/524 | 350/380 |
| 100% Modulus (psi) MD/TD | 1239/1000 | 1200/1000 |
| Cold Crack (°F.) | −40 | −20 |
| Compression Set (%) | 39.5 | 44.5 |

In the above Table 1, the: thickness was measured by ASTM D 1593; specific gravity was measured by ASTM D 792; tensile was measured by ASTM D 882; elongation was measured by ASTM D 882; modulus was measured by ASTM D 882; and cold crack was measured by ASTM D 1790. Compression set is a test of the material's ability to recover its shape after physical stress. The procedure for determining compression set is as follows: The material is compressed at room temperature for a specific amount of time and then it is allowed to recover its original shape. The percentage of overall stress from which the sample does not recover is the compression set. Lower numbers indicate better performance.

EXAMPLE 2

This example was performed in order to compare weathering of a sheet of PVC of Formulation A, the invention formulation, with a sheet of PVC of Formulation B, as described in Example 1.

Xenon arc weathering as shown in Table 2 is a standard well known test in the industry.

Cielab difference is the name of the algorithm which generates values associated with differences between the wavelengths of light reflected by a sample relative to a standard. Cielab is one of several packages currently in the market and it is the one which appears to be most frequently used.

"Specular included mode" is a setting on the spectrophotometer which measures the total reflectance including diffuse color and specular reflection. This is the opposite of "specular excluded" which measures only diffuse color.

The results of this example are shown in Table 2 wherein color changes due to weathering of the two formulations are shown in relation to time in hours. In Table 2, the terms: dL is light/dark aspect (light+); da is red/green aspect (red+); and db is yellow blue aspect (yellow+). Typically, a number between −1 and +1 represents a color difference which is difficult to detect by eye. Weathering of vinyl is accomplished by a yellowing of the sheet. Therefore changes in the db numbers will be the most telling. Secondly, samples tend to lighten, therefore dL values are also relevant. It can be seen from Table 2 that at 750 hours, Formulation B had already begun significant yellowing. Formulation A remained relatively unchanged. At 1000 hours Formulation B is yellower still (db=1.37) whereas Formulation A is unchanged (db = −0.09). At 1250 hours Formulation B exhibited pronounced yellowing (db=2.86) while yellowing in Formulation A remained below the threshold of significant difference (db=0.89). Formulation B also shows significant lightening (dL=1.75) whereas Formulation A shows essentially no change (dL=0.33).

TABLE 2

XENON WEATHERING CIELAB DIFFERENCE, SPECULAR INCLUDED MODE

| TIME (HOURS) | | FORMULATION A | FORMULATION B |
|---|---|---|---|
| 250 | dL | 0.21 | 0.31 |
| | da | −0.43 | −0.45 |
| | db | −0.03 | 0.53 |
| 500 | dL | 0.22 | 0.49 |
| | da | −0.50 | −0.50 |
| | db | −0.19 | 0.72 |
| 750 | dL | 0.31 | 0.74 |
| | da | −0.59 | −0.58 |
| | db | −0.18 | 1.05 |
| 1000 | dL | 0.28 | 0.95 |
| | da | −0.64 | −0.53 |
| | db | −0.09 | 1.37 |
| 1250 | dL | 0.33 | 1.75 |
| | da | −0.92 | −0.62 |
| | db | 0.89 | 2.86 |

EXAMPLE 3

WEATHERING TEST

After exposure to 1500 hours continuous ultraviolet radiation in a Q-U-V weatherometer, samples were evaluated spectrophotometrically using Cielab large area specular included readings. This is a very severe test, largely due to the fact that the bulbs used in the Q-U-V weatherometer which is manufactured by Q-Panel Company of Cleveland, Ohio are UVB-313 bulbs which are noted for their aggressive wavelength of U.V. (ultra violet) radiation. Two competitive samples were evaluated, one had a db (yellowing) of 25.16 and the other had a db of 29.35. The film of Formulation B, described hereinabove, had a dB of 13.45. Formulation A, described hereinabove, had a db of 11.47. This is significantly better than the other sheets.

EXAMPLE 4

TESTS OF METAL STABILIZERS

After much study we have found that resistance to the degrading effects of chlorine solution is dependent upon the type of mixed metal stabilizer in the compound formulation. Here, too, degradation of PVC is accompanied by yellowing of the sample. Test solutions were made of trichloroisocyanuric acid and samples were exposed for 7 days. The db readings for the 3 competitors material were 2.91, 5.88, and 6.85. Formulation B using a Ba-Cd-Zn mixed metal stabilizer had a db=3.62 and the sample of Formulation A ( a sample of the invention) had a db =1.93. These results show the superiority of a stabilizer containing a mixture of barium, zinc and alkyl phosphite.

What is claimed is:

1. A polyvinyl chloride resin composition comprising a mixture of:
   A. 100 parts by weight of polyvinyl chloride resin wherein 40% to 60% by weight of said resin is an ultra high molecular weight polyvinyl chloride resin having a molecular weight of 185,000 to 225,000 and 40% to 60% of said resin is a high molecular weight polyvinyl chloride resin having a molecular weight of 115,000 to 150,000;
   B. from about 1 to 6 parts by weight of a mixed barium-zinc-alkyl phosphite heat stabilizer;
   C. an ultra violet absorber; and
   D. from about 30 to 100 parts by weight of a plasticizer.

2. The composition of claim 1 wherein the ultra high molecular weight resin has a molecular weight of 190,000 to 210,000 and the high molecular weight resin has a molecular weight of 120,000 to 130,000.

3. The composition of claim 2 which includes a 2-hydroxy-4-(2-hydroxyloweralkoxy)benzophenone ultra violet absorber wherein the loweralkoxy contains from 1 to 4 carbon atoms.

4. The composition of claim 3 wherein the benzophenone is 2-hydroxy-4-(2-hydroxyethoxy)benzophenone.

5. The composition of claim 4 wherein about 50% of the resin is an ultra high molecular weight polyvinyl chloride resin with a molecular weight of about 190,000 to 210,000 and about 50% of the polyvinyl chloride resin is a high molecular weight polyvinyl chloride resin with a molecular weight of about 115,000 to 150,000.

6. The composition of claim 4 which includes from about 0.5 to 10 parts by weight of an acrylic processing aid, about 0.1 to 1 parts by weight of a fatty acid lubricant, about 1 to 10 parts by weight of a biocide and 1 to 15 parts by weight of epoxidized soybean oil and the ultra high molecular weight polyvinyl chloride resin is a homopolymer of vinyl chloride.

7. The composition of claim 5 wherein the ultra high molecular weight polyvinyl chloride resin has a molecular weight of about 200,000 a relative viscosity of about 4.00 and a Finkentscher K value of about 93 whereas the high molecular weight polyvinyl chloride resin has a relative viscosity of about 2.5 and a Fikentscher K value of about 72.

8. The composition of claim 1 wherein the plasticizer is a member selected from the group consisting of a dialkyl phthalate and dialkyl adipate wherein each alkyl group is straight chain alkyl having at least 7 carbon atoms.

9. A flexible sheet of a polyvinyl chloride resin composition comprising a mixture of:
   A. 100 parts by weight of polyvinyl chloride resin wherein 40% to 60% by weight of said resin is an ultra high molecular weight polyvinyl chloride resin having a molecular weight of 185,000 to 225,000 and 40% to 60% of said resin is a high molecular weight polyvinyl chloride resin having a molecular weight of 115,000 to 150,000;
   B. from about 1 to 6 parts by weight of a mixed barium-zinc-alkyl phosphite heat stabilizer;
   C. from about 0.1 to 1 part of an ultra violet absorber; and
   D. from about 30 to 100 parts by weight of a plasticizer.

10. The flexible sheet of claim 9 wherein the ultra high molecular weight resin has a molecular weight of from about 190,000 to 210,000 and the high molecular weight resin has a molecular weight of 120,000 to 130,000.

11. The flexible sheet of claim 10 which contains from about 0.1 to 1 part of 2-hydroxy-4-(2-hydroxyethoxy) benzophenone.

12. The flexible sheet of claim 10 wherein:
A. about 50% by weight of the polyvinyl chloride resin is ultra high molecular weight polyvinyl chloride having a molecular weight of 190,000 to 210,000 and about 50% of the polyvinyl chloride resin is high molecular weight polyvinyl chloride having a molecular weight of about 120,000 to 130,000; and
B. the composition includes about 0.1 to 1 part of 2-hydroxy-4-(2-hydroxyethoxy) benzophenone.

13. A process for preparing a flexible swimming pool liner which comprises:
A. forming a mixture by mixing 100 part as by weight of polyvinyl chloride resin wherein at least 35% by wight thereof is an ultra high molecular weight polyvinyl chloride resin having a molecular weight of 185,000 to 225,000 and at least 25% of the polyvinyl chloride is a high molecular weight polyvinyl chloride resin having a high molecular weight of 115,000 to 150,000, from about 1 to 6 parts by weight of a mixture of barium and zinc heat stabilizers, and from about 30 to 100 parts by weight of a plasticizer;
B. fluxing the mixture;
C. forming the fluxed mixture into a sheet; and
D. cutting and adhering the sheets to each other to form a swimming pool liner.

14. The process of claim 13 wherein at least 40% by weight of the polyvinyl chloride resin is an ultra high molecular weight polyvinyl chloride resin having a molecular weight of from 185,000 to 225,000.

15. The process of claim 13 wherein at least 40% by weight of the polyvinyl chloride resin is an ultra high molecular weight polyvinyl chloride resin having a molecular weight of at least 185,000 and 40% by weight of the polyvinyl chloride resin is a high molecular weight polyvinyl chloride resin having a molecular weight of about 115,000 to 150,000 and wherein the fluxed mixture is calendared at a temperature of about 370° F. to 400° F. to form a flexible sheet having a thickness of 0.02 to 0.03 inches.

16. The process of claim 15 wherein the heat stabilizer is a mixture of barium, zinc and alkyl phosphite stabilizers.

17. The process of claim 16 which includes a 2-hydroxy-4-(2-hydroxyloweralkoxy)benzophenone wherein the loweralkoxy group contains from 1 to 4 carbon atoms.

18. The process of claim 17 wherein the benzophenone is 2-hydroxy-4-(2-hydroxyethoxy)benzophenone.

19. The process of claim 15 wherein about 50% by weight of the polyvinyl chloride resin as an ultra high molecular weight polyvinyl chloride resin having a molecular weight of 185,000 to 225,000 and about 50% of the polyvinyl chloride resin is a high molecular weight polyvinyl chloride resin having a molecular weight of about 115,000 to 150,000.

20. The process of claim 15 which includes from about 0.5 to 10 parts by weight of an acrylic processing aid, about 0.1 parts by weight to 1 part by weight of a fatty acid lubricant, about 1 part by weight to 10 parts by weight of a biocide and 1 part by weight to 15 parts by weight of epoxidized soybean oil.

21. The process of claim 20 wherein the ultra high molecular weight polyvinyl chloride has a relative viscosity of about 4.00 and a Fikentscher K value of about 93 whereas the high molecular weight polyvinyl chloride has a relative viscosity of about 2.5 and a Fikentscher K value of about 72.

22. A flexible polyvinyl chloride swimming pool liner comprised of the composition of claim 13.

23. The liner of claim 22 wherein at least 35% by weight of the polyvinyl chloride resin is a high molecular polyvinyl chloride resin having a molecular weight of from about 115,000 to 150,000.

24. The liner of claim 22 wherein at least 40% by weight of the polyvinyl chloride is an ultra high molecular weight polyvinyl chloride resin having a molecular weight of 185,000 to 225,000.

25. The liner of claim 23 wherein at least 40% by weight of the polyvinyl chloride resin in a high molecular polyvinyl chloride resin having a molecular weight of 115,000 to 150,000.

26. The liner of claim 22 wherein the polyvinyl chloride resin is a mixture comprising an ultra high molecular weight polyvinyl chloride resin having a molecular weight of 190,000 to 210,000 and a high molecular weight resin having a molecular weight of 115,000 to 150,000 and wherein the heat stabilizer is a mixture of barium, zinc, and alkyl phosphite heat stabilizers.

27. The liner of claim 25 wherein the heat stabilizer is a mixed barium-zinc-trialkyl phosphite stabilizer.

28. The liner of claim 26 which includes a 2-hydroxy-4-(2-hydroxyloweralkoxy) benzophenone wherein the loweralkoxy group contains from about 1 to 4 carbon atoms.

29. The liner of claim 28 wherein the benzophenone is 2-hydroxy-4-(2-hydroxyethoxy) benzophenone.

* * * * *